(12) United States Patent
Mikami et al.

(10) Patent No.: US 9,514,779 B2
(45) Date of Patent: Dec. 6, 2016

(54) METHOD FOR MANUFACTURING MULTILAYER STRUCTURE SHEET, AND OPTICAL INFORMATION RECORDING MEDIUM

(71) Applicant: FUJIFILM Corporation, Minato-Ku, Tokyo (JP)

(72) Inventors: Tatsuo Mikami, Odawara (JP); Hidehiro Mochizuki, Odawara (JP); Akiko Henmi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 14/204,896

(22) Filed: Mar. 11, 2014

(65) Prior Publication Data

US 2014/0193601 A1 Jul. 10, 2014

Related U.S. Application Data

(63) Continuation of application No. PCT/JP2012/066145, filed on Jun. 25, 2012.

(30) Foreign Application Priority Data

Sep. 13, 2011 (JP) .................................. 2011-199135

(51) Int. Cl.
*B29C 65/54* (2006.01)
*B32B 37/12* (2006.01)
(Continued)

(52) U.S. Cl.
CPC ............ *G11B 7/26* (2013.01); *G11B 7/24018* (2013.01); *G11B 7/24038* (2013.01); *Y10T 428/1476* (2015.01)

(58) Field of Classification Search
USPC ...... 156/247, 249, 289, 307.3, 307.5, 308.2, 156/309.6, 309.9
See application file for complete search history.

(56) References Cited

U.S. PATENT DOCUMENTS

| 4,581,087 A * | 4/1986 | Johnson .................. B29C 59/04 156/209 |
|---|---|---|
| 2005/0142318 A1 | 6/2005 | Nakabayashi et al. |
| 2011/0080824 A1 | 4/2011 | Ito et al. |
| 2011/0085437 A1 | 4/2011 | Ito et al. |
| 2013/0196115 A1 | 8/2013 | Ito et al. |

FOREIGN PATENT DOCUMENTS

| JP | 2002367232 A | 12/2002 |
|---|---|---|
| JP | 2005-209328 A | 8/2005 |

(Continued)

OTHER PUBLICATIONS

Notification of Reasons for Refusal, dated Jun. 3, 2014, issued in corresponding JP Application No. 2011-199135, 6 pages in English and Japanese.

(Continued)

*Primary Examiner* — Sing P Chan
(74) *Attorney, Agent, or Firm* — Sughrue Mion, PLLC

(57) ABSTRACT

A method for manufacturing a multilayer structure sheet for manufacturing an optical information recording medium having a multilayer structure with a plurality of recording layers comprises: an adhesive layer forming step of forming an adhesive layer on a first release sheet to obtain a first sheet; a recording layer forming step of forming a recording layer containing a polymer on a second release sheet or a release assisting layer formed on the second release sheet to obtain a second sheet; a laminating step of laminating the recording layer of the second sheet on the adhesive layer of the first sheet to obtain a third sheet in which the second sheet is laid on the first sheet; and a heating step of heating the second sheet.

8 Claims, 12 Drawing Sheets

(51) Int. Cl.
*B32B 37/26* (2006.01)
*B32B 38/10* (2006.01)
*B32B 43/00* (2006.01)
*G11B 7/26* (2006.01)
*G11B 7/24038* (2013.01)
*G11B 7/24018* (2013.01)

(56) References Cited

FOREIGN PATENT DOCUMENTS

| | | |
|---|---|---|
| JP | 2009-252328 A | 10/2009 |
| JP | 2011-081860 A | 4/2011 |
| TW | 201007725 A | 2/2010 |
| TW | 201124988 A | 7/2011 |
| WO | 2009/154289 A1 | 12/2009 |

OTHER PUBLICATIONS

International Search Report for PCT/JP2012/066145 dated Sep. 18, 2012, 1 page.

Notification of the First Office Action, dated Mar. 4, 2016, issued in corresponding CN Application No. 2012800441164, 16 pages in English and Chinese.

Communication dated Aug. 3, 2016, from the State Intellectual Property Office of People's Republic in counterpart application No. 2012800441164.

\* cited by examiner

FIG.4
(a)
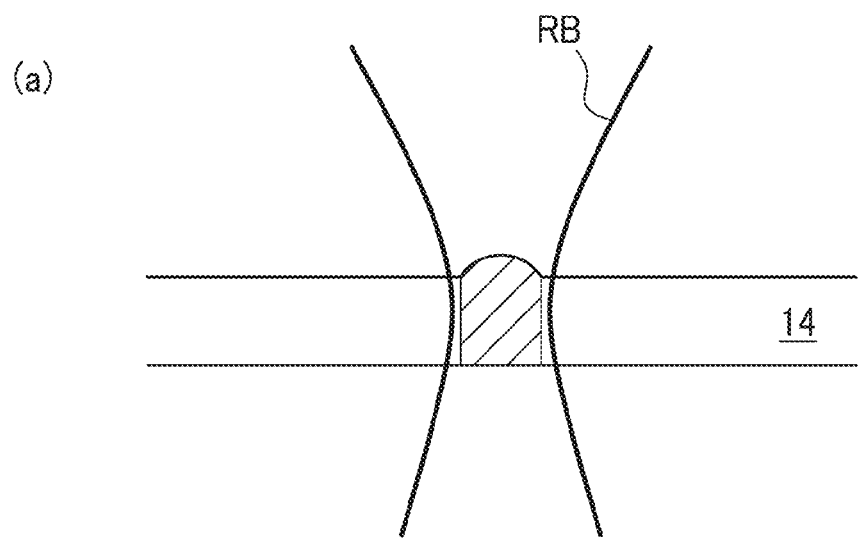
(b)
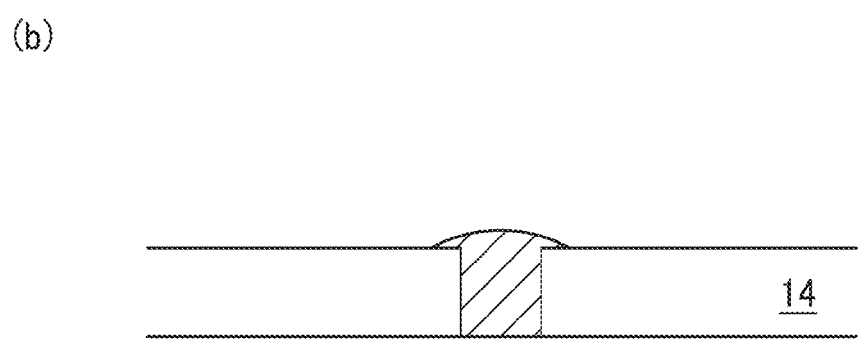
(c)
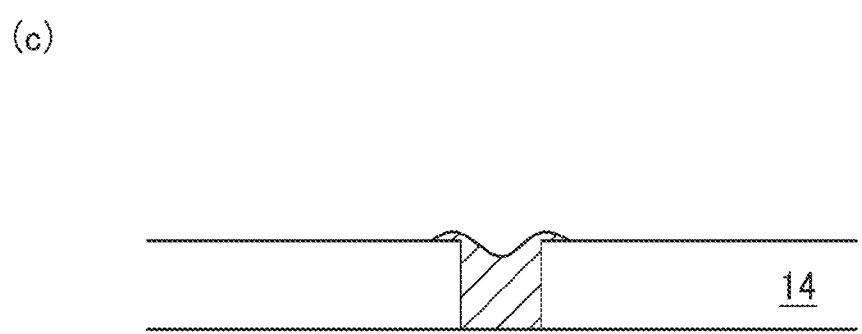

FIG.9
(a)
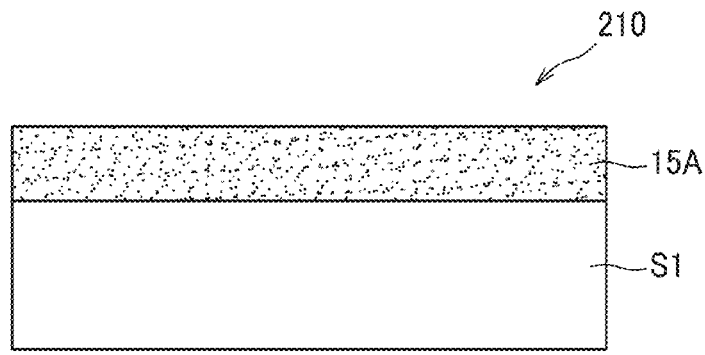
(b)
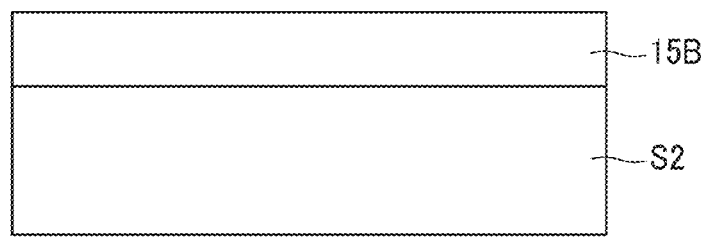
(c)
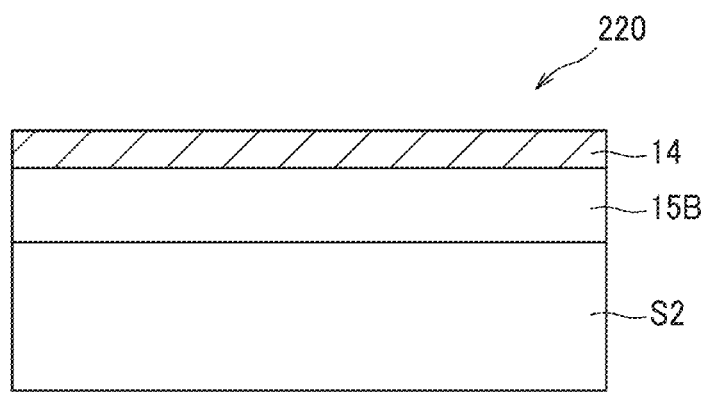

FIG.10
(a)
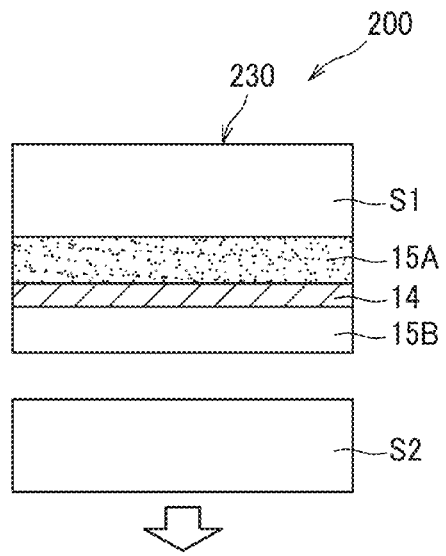
(b)
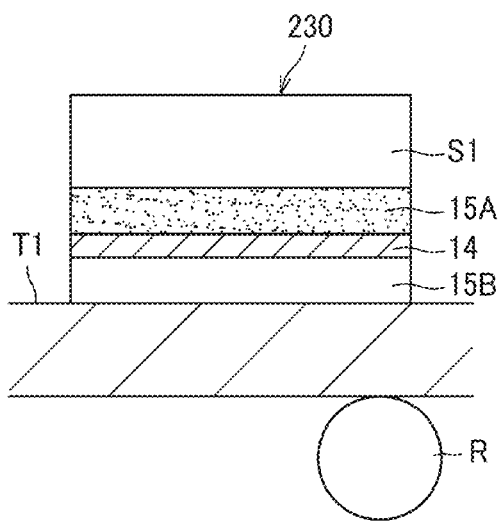
(c)
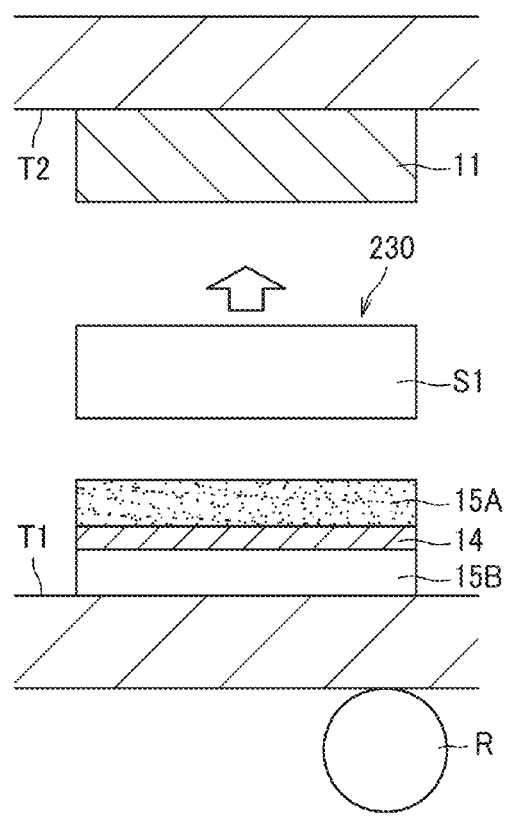
(d)
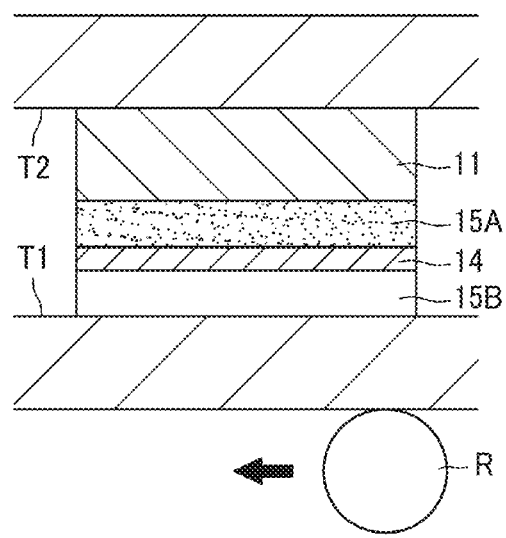

FIG.11

| | RECORDING LAYER MATERIAL | Tg OF RECORDING LAYER MATERIAL | HEATING TEMPERATURE | COOLING TEMPERATURE | RELEASE ASSISTING LAYER | DETECTION OF CRACKING |
|---|---|---|---|---|---|---|
| COMPARATIVE EXAMPLE 1-1 | COMPOUND A + PMMA | 62°C | NOT HEATED | NOT COOLED | NOT PROVIDED | OBSERVED |
| COMPARATIVE EXAMPLE 1-2 | COMPOUND A + PMMA | 62°C | 40°C | 25°C | NOT PROVIDED | OBSERVED |
| COMPARATIVE EXAMPLE 1-3 | COMPOUND A + PMMA | 62°C | 50°C | 25°C | NOT PROVIDED | OBSERVED |
| EXAMPLE 1-1 | COMPOUND A + PMMA | 62°C | 60°C | 25°C | NOT PROVIDED | NOT OBSERVED |
| EXAMPLE 1-2 | COMPOUND A + PMMA | 62°C | 70°C | 25°C | NOT PROVIDED | NOT OBSERVED |
| EXAMPLE 1-3 | COMPOUND A + PMMA | 62°C | 80°C | 25°C | NOT PROVIDED | NOT OBSERVED |
| EXAMPLE 1-4 | COMPOUND A + PMMA | 62°C | 90°C | 25°C | NOT PROVIDED | NOT OBSERVED |
| COMPARATIVE EXAMPLE 2-1 | COMPOUND B | 42°C | NOT HEATED | NOT COOLED | NOT PROVIDED | OBSERVED |
| COMPARATIVE EXAMPLE 2-2 | COMPOUND B | 42°C | 40°C | 25°C | NOT PROVIDED | OBSERVED |
| COMPARATIVE EXAMPLE 2-3 | COMPOUND B | 42°C | 50°C | 25°C | NOT PROVIDED | OBSERVED |
| COMPARATIVE EXAMPLE 2-4 | COMPOUND B | 42°C | 60°C | 25°C | NOT PROVIDED | OBSERVED |
| EXAMPLE 2-1 | COMPOUND B | 42°C | 70°C | 25°C | NOT PROVIDED | NOT OBSERVED |
| EXAMPLE 2-2 | COMPOUND B | 42°C | 70°C | NOT COOLED | NOT PROVIDED | NOT OBSERVED |
| EXAMPLE 2-3 | COMPOUND B | 42°C | 80°C | 25°C | NOT PROVIDED | NOT OBSERVED |
| EXAMPLE 2-4 | COMPOUND B | 42°C | 90°C | 25°C | NOT PROVIDED | NOT OBSERVED |
| EXAMPLE 3-1 | COMPOUND C | 54°C | 100°C | 25°C | NOT PROVIDED | OBSERVED SLIGHTLY |
| EXAMPLE 3-2 | COMPOUND C | 54°C | 100°C | -20°C | NOT PROVIDED | NOT OBSERVED |
| EXAMPLE 3-3 | COMPOUND C | 54°C | 100°C | 25°C | PROVIDED | NOT OBSERVED |
| COMPARATIVE EXAMPLE 3-1 | COMPOUND C | 54°C | NOT HEATED | NOT COOLED | PROVIDED | OBSERVED |

METHOD FOR MANUFACTURING MULTILAYER STRUCTURE SHEET, AND OPTICAL INFORMATION RECORDING MEDIUM

CROSS-REFERENCE TO RELATED APPLICATION(S)

This application is a continuation of International Application No. PCT/JP2012/066145 filed on Jun. 25, 2012, which claims priority from Japanese Patent Application No. 2011-199135 filed on Sep. 13, 2011 in the Japan Patent Office, the disclosure of which is herein incorporated by reference in its entirety.

BACKGROUND

1. Field

The present invention relates to a method for manufacturing a multilayer structure sheet for manufacturing an optical information recording medium having a multilayer structure with a plurality of recording layers, and an optical information recording medium having a multilayer structure with a plurality of recording layers.

2. Description of Related Art

Conventionally, as a method for manufacturing an optical information recording medium having a multilayer structure with a plurality of recording layers, a method using a multilayer structure sheet having laminates of a recording layer and a pressure sensitive adhesive layer is known in the art (e.g., Patent Literature 1). To be more specific, a multilayer structure sheet described in Patent Literature 1 has a release film attached to each of outer surfaces of a laminate of recording and pressure sensitive layers. By peeling this release film off the multilayer structure sheets and stacking and sticking the sheets over a substrate repeatedly one on top of another, an optical information recording medium having a multilayer structure can be obtained. In this type of manufacturing method using a multilayer structure sheet, a plurality of optical information recording media can be manufactured in bulk by preparing a large-size multilayer structure sheet.

However, the multilayer structure sheet as described in Patent Literature 1 is configured to have a release film attached to the recording layer, and thus involves a risk of cracking occurring in the recording layer when the release film is peeled off. With this in view, there is proposed a multilayer structure sheet so configured as to have a release film not directly attached to any recording layer (e.g., Patent Literature 2). To be more specific, the multilayer structure sheet described in Patent Literature 2 has a multilayer structure comprising a pressure sensitive adhesive layer, a recording layer and a release assisting layer arranged in this order, and a release film is attached to each of the outermost layers that are the pressure sensitive adhesive layer and the release assisting layer. With this configuration in which the recording layer is sandwiched between the pressure sensitive adhesive layer and the release assisting layer as described above so that the release film is not directly attached to any recording layer, the possibility of cracking in the recording layer which would occur when the release film is peeled off can be reduced.

CITATION LIST

Patent Literature(s)

Patent Literature 1: JP 2005-209328 A
Patent Literature 2: JP 2011-81860 A

SUMMARY

However, even when the multilayer structure sheet as described in Patent Literature 2 is adopted, cracking may possibly occur in the recording layer when the release film is peeled off, depending on the material for the recording layer.

With this problem in view, the inventors named in the present application have made the present invention in the process of study for providing a method for manufacturing a multilayer structure sheet and an optical information recording layer, in which cracking is unlikely to occur in a recording layer.

In one aspect of the present invention, a method for manufacturing a multilayer structure sheet for manufacturing an optical information recording medium having a multilayer structure with a plurality of recording layers is provided. This method comprises: an adhesive layer forming step of forming an adhesive layer on a first release sheet to obtain a first sheet; a recording layer forming step of forming a recording layer containing a polymer on a second release sheet or a release assisting layer formed on a second release sheet to obtain a second sheet; and a laminating step of laminating the recording layer of the second sheet on the adhesive layer of the first sheet to obtain a third sheet in which the second sheet is laid on the first sheet. Further, this method comprises a heating step of heating the second sheet. This heating step may be performed before the laminating step.

In another aspect of the present invention, the above-described method for manufacturing a multilayer structure sheet may comprise, in place of the heating step of heating the second sheet obtained in the recording layer forming step before the laminating step, a heating step of heating the third sheet obtained in the laminating step.

With these configurations, cracking is unlikely to occur in the recording layer when the first release sheet or the second release sheet is removed from the third sheet.

The above-described method for manufacturing a multilayer structure sheet which comprises the heating step of heating the third sheet may, preferably, further comprise a removing step, performed during the heating step, of removing the second release sheet.

The above-described method for manufacturing a multilayer structure sheet which comprises the heating step of heating the second sheet may, preferably, further comprise a cooling step, performed after the heating step, of cooling the heated second sheet. More preferably, the cooling step may comprise placing the second sheet in a temperature lower than ambient temperature.

With these configurations, cracking is more unlikely to occur in the recording layer when the second release sheet is removed from the second sheet.

The above-described method for manufacturing a multilayer structure sheet which comprises the heating step of heating the third sheet may, preferably, further comprise a cooling step of cooling the heated third sheet after the heating step before removing the second release sheet, and more preferably, this cooling step may comprise placing the third sheet in a temperature lower than ambient temperature.

With these configurations, cracking is more unlikely to occur in the recording layer when the first release sheet or the second release sheet is removed from the third sheet.

In yet another aspect of the present invention, an optical information recording medium is provided which is manufactured by using a multilayer structure sheet manufactured by the above-described method for manufacturing a multilayer structure sheet.

According to one or more of embodiments of the present invention, the heating step of heating the recording layer, included therein, serves to make the recording layer unlikely to be cracked when the first release sheet or the second release sheet is removed.

The above-described aspects and advantages, and other advantages and further features of the present invention will become more apparent by a detailed description of illustrative, non-limiting embodiments of the present invention which will be given below with reference to the accompanying drawings.

BRIEF DESCRIPTION OF THE DRAWINGS

FIG. 4 is a diagram for explaining the process of forming a recessed shape in an optical information recording medium known in the art.

FIG. 9 is a diagram for explaining a method for manufacturing the multilayer structure sheet according to the second embodiment.

FIG. 10 is a diagram for explaining a method for manufacturing the optical information recording medium according to the second embodiment FIG. 11 is a table in which the results of experiments 1, 2 and 3 are compiled.

DESCRIPTION OF EMBODIMENT(S)

First Embodiment

Next, the first embodiment of the present invention will be described below with reference to the drawings.

Figure 1:
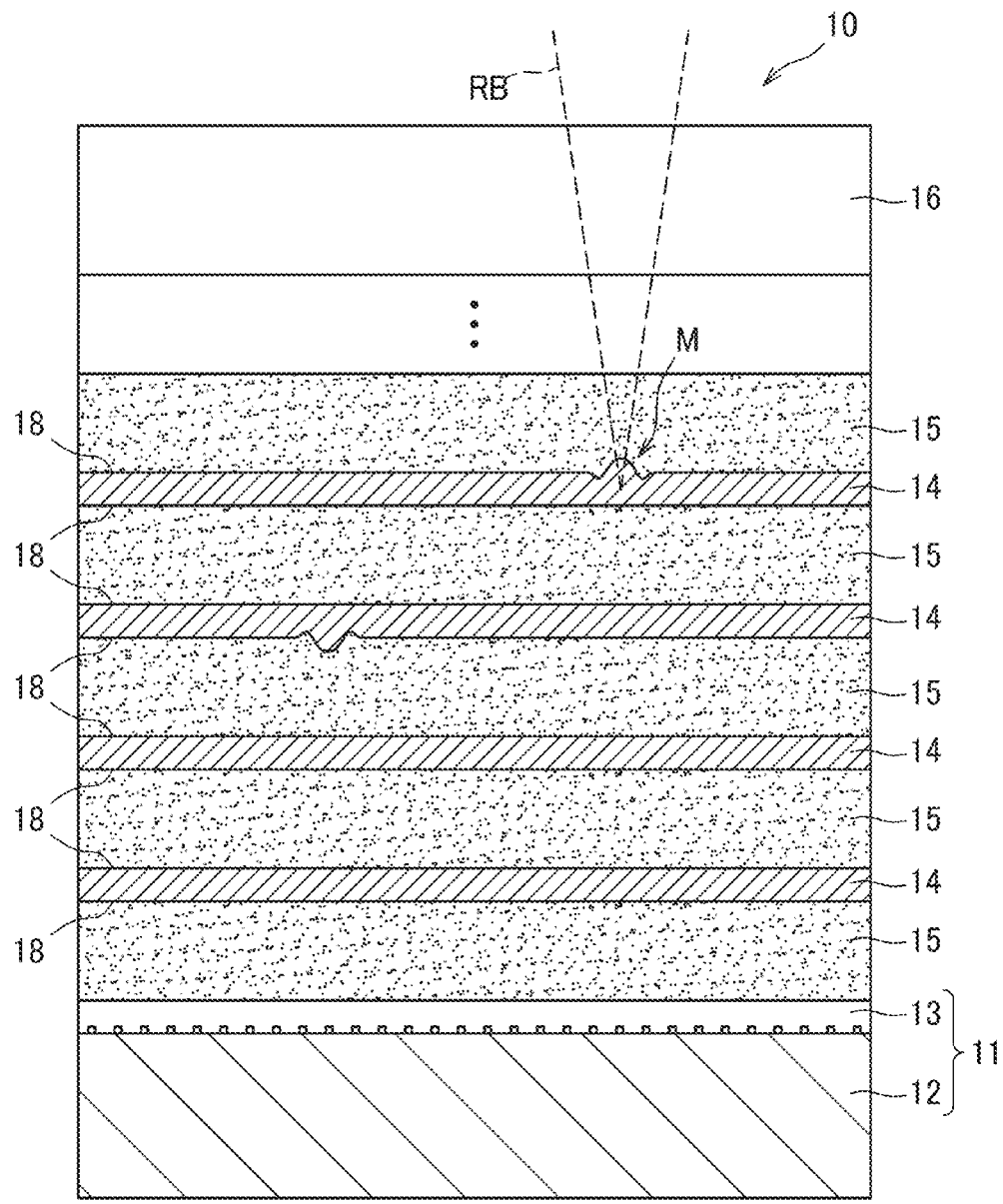
FIG. 1 is a sectional view of an optical information recording medium according to a first embodiment.

As shown in FIG. 1, an optical information recording medium 10 according to the first embodiment of the present invention comprises a substrate 11, a plurality of recording layers 14, a plurality of intermediate layers 15, and a cover layer 16.

The substrate 11 comprises a support plate 12 and a servo signal layer 13.

The support plate 12 is a supporting member for supporting the recording layer 14 and other layers, and is made of a polycarbonate disc, for example. The material for the support plate 12 and its thickness are not limited in particular.

The servo signal layer 13 is a layer which is made of a tacky or adhesive resinous material to retain the recording layers 14 and the intermediate layers 15 on the support plate 12, and of which a support plate 12 side surface has a servo signal pre-recorded as irregularities in shape or variations in refractive index. Herein, the servo signal is a signal being preset so that a recording and reading apparatus can recognize it as a reference surface for focus control during the recording and reading processes. In order to bring a specific recording layer 14 into focus, the focusing control is exercised with consideration given to the distance measured and/or the number of interfaces counted from this reference surface. Furthermore, a track-following servo signal or groove may preferably be provided so that a track of circumferentially arranged recording spots can be illuminated accurately with a laser beam during the recording and reading processes. It is appreciated that presence or absence of the servo signal layer 13 is optional.

The recording layer 14 is a layer made of a photosensitive material in which information is optically recordable; in this embodiment, the recording layer 14 contains a polymer binder and a dye dispersed in the polymer binder. When the recording layer 14 is irradiated with a recording beam, the dye absorbs the recording beam and generates heat, which causes the polymer binder to deform so as to form a protrusive shape protruding into the intermediate layer 15 at the interface 18 between the recording layer 14 and an intermediate layer 15, so that information is recorded. To be more specific, as will be described later, its center becomes a protrusion-shaped portion protruding from the recording layer 14 into the intermediate layer 15 and a portion surrounding the protrusion-shaped portion is formed as a recess-shaped portion recessed (as seen with reference to the recording layer 14) from the intermediate layer 15 into the recording layer 14.

To this end, the recording layer 14 is thicker than conventional recording layers containing a polymer binder and a dye; one recording layer 14 has a thickness in the range of 50 nm to 20 micrometers, preferably in the range of 100 nm to 15 micrometers, more preferably in the range of 200 nm to 10 micrometers. If the thickness is less than 50 micrometers, the interface 18 between the recording layer 14 and the intermediate layer 15 deforms, such that a recessed shape is formed in the interface 18 with reference to the recording layer 14, as in a conventional art; however, as the thickness not less than 50 micrometers is provided herein, the interface 18 deforms such that the center of the recorded spot becomes a protrusion.

The number of the recording layers 14 provided may be approximately in the range of 2 to 100 layers. To increase the storage capacity of the optical information recording medium 10, the more the number of the recording layers 14, the better it may be; for example, it is preferable that ten or more layers are provided. Moreover, the refractive index of the recording layer 14 may, but not necessarily, change before and after recording.

The recording layer 14 may preferably have a recording beam absorption ratio (of one-photon absorption) equal to or less than 5% per one layer. Further, this absorption ratio may be more preferably equal to or less than 2%, and further more preferably equal to or less than 1%. This is because, for example, if the intensity of the recording beam which reaches the deepest recording layer 14 has to be equal to or more than 50% of the intensity of the radiated recording beam, it is necessary that the absorption ratio per one recording layer is equal to or less than 2% in order to obtain thirty-layered recording layers, and it is necessary that the absorption ratio per one recording layer is equal to or less than 1% in order to obtain fifty-layered recording layers. Another reason is that if the absorption ratio is higher, the recording layer 14 is likely to be overheated and thus formation of a protrusive shape in the interface 18 becomes difficult.

The recording layer 14 may be formed by any method without limitation; for example, it may be formed by spin coating or blade coating using a liquid obtained by dissolving a dye material and a polymer binder in a solvent. Examples of the solvent usable for this purpose may include dichloromethane, chloroform, methyl ethyl ketone (MEK), acetone, methyl isobutyl ketone (MIBK), toluene, hexane, and the like.

Examples of the polymer binder for use in the recording layer 14 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), polyvinyl benzoate, poly(vinyl pivalate), polyethylacrylate, polybutylacrylate, and the like.

Examples of the recording beam-absorbing dye for use in the recording layer 14 may include dyes (one-photon absorption dyes) which have been conventionally used as a heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used. Further, for recording beam-absorbing dyes in a recording medium having a plurality of recording layers, those which contain a multiphoton absorption dye are preferable in order to minimize adverse effects on adjacent recording layers during recording/reading processes. As an example of the multiphoton absorption dye, a two-photon absorption compound having no linear absorption in the wavelength range of the reading beam is preferable.

As long as the two-photon absorption compound has no linear absorption in the wavelength range of the reading beam, any known two-photon absorption compound may be used without limitation; for example, compounds having a structure represented by the following general formula (1) may be used.

[Chem. 1]

General Formula (1)

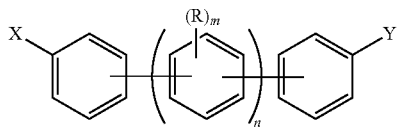

In the general formula (1), X and Y each represent a substituent having a Hammett's sigma-para value (σp value) of 0 or more, which may be the same as or different from each other; n represents an integer of 1 to 4; R represents a substituent, and a plurality of Rs may be the same as or different from one another; and m represents an integer of 0 to 4.

In the general formula (1), each of X and Y represents a group having a σp value taking a positive value in Hammett equation, i.e., what is called an electron-withdrawing group, which preferably includes, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of such substituents preferably include an alkyl group, an alkoxy group, an alkoxyalkyl group, an aryloxy group, etc.

n preferably is 2 or 3, and most preferably 2. If n is 5 or more, the greater n becomes, the more the linear absorption appears at the longer wavelength side, so that non-resonant two-photon absorption recording is not done with a recording beam at a wavelength range shorter than 700 nm.

R represents a substituent. The substituent is not specifically limited, and an alkyl group, an alkoxy group, an alkoxyalkyl group, and an aryloxy group are exemplified as specific examples.

The compound having the structure represented by the general formula (1) is not limited to specific examples; the compounds represented by the following chemical structural formulae D-1 to D-21 may be used.

[Chem. 2]

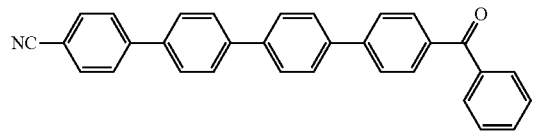

D-1

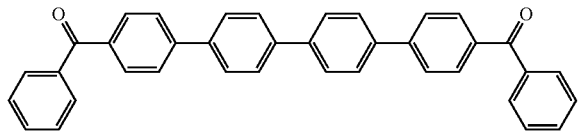

D-2

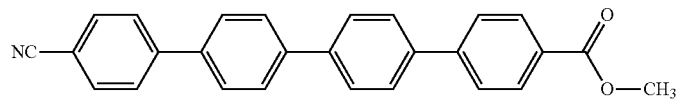

D-3

-continued
D-4
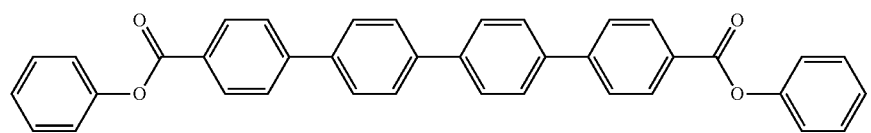
D-5
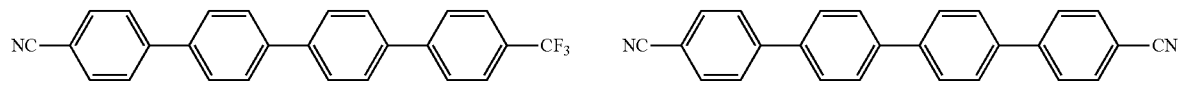
D-6
D-7
D-8
D-9
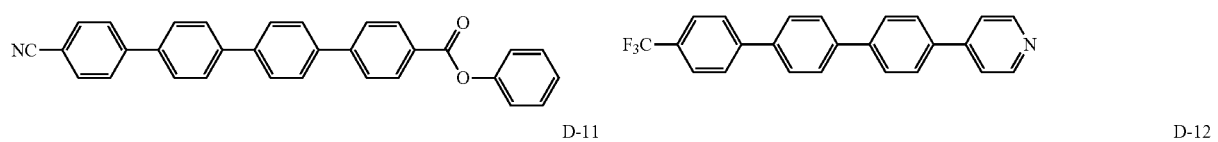
D-10
D-11
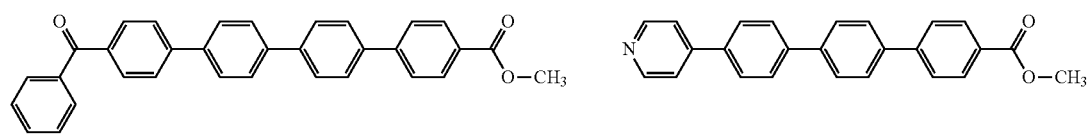
D-12
D-13
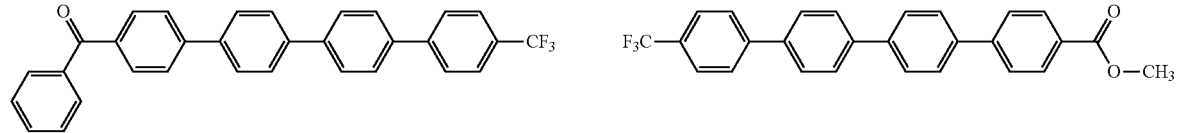
D-14
D-15
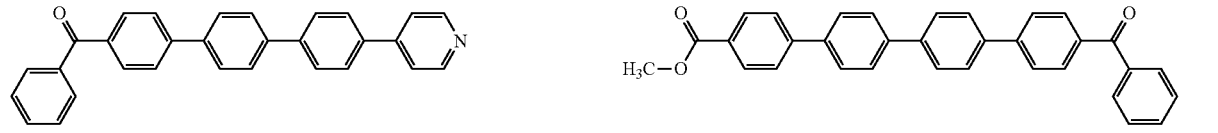
D-16
D-17
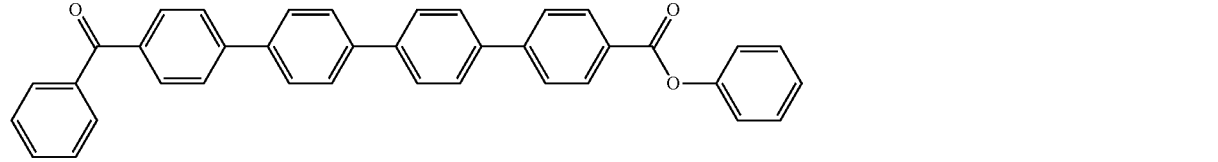
D-18
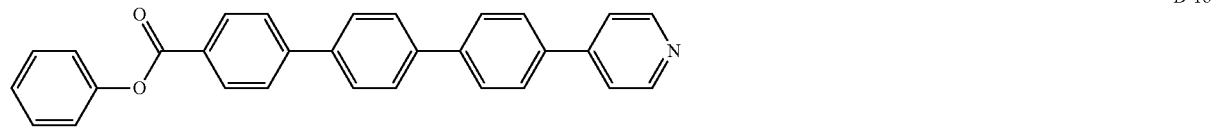
D-19

-continued

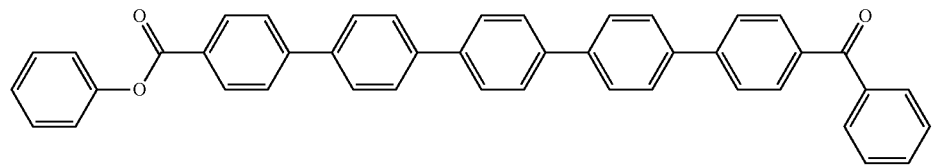

D-20

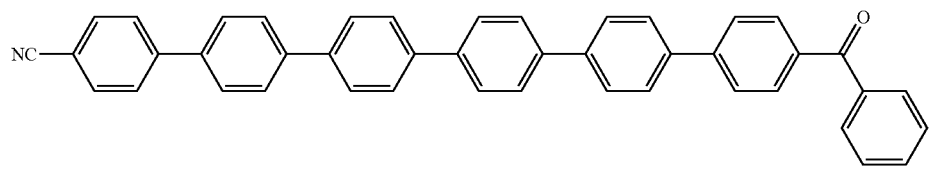

D-21

The intermediate layer 15 is provided between the recording layers 14. In other words, the intermediate layer 15 is provided adjacent to the topside and underside of each recording layer 14. In order to prevent interlayer crosstalk across a plurality of recording layers 14 (i.e., phenomenon in which a signal from one recording layer 14 is mixed with another signal from an adjacent recording layer 14), each intermediate layer 15 is provided to form a predetermined amount of space between the recording layers 14. For this purpose, the thickness of the intermediate layer 15 is equal to or more than 3 micrometers, and in the present embodiment as one example, it is 10 micrometers.

The intermediate layer 15 is made of a material which is unreactive to irradiation with a laser beam applied during recording and reading operations. Further, in order to minimize the loss of the recording beam, the reading beam, and a read-back beam (a beam of light in which a read-back signal generated by irradiation with a reading beam is embedded), it is preferable that the intermediate layer 15 is made of a material which is transparent to the recording beam, the reading beam, and the read-back beam. Herein, the term "transparent" indicates that the absorption ratio thereof is equal to or less than 1%.

The intermediate layer 15 is an adhesive layer, and has an adhesive property with which it can be stuck to a surface of another object, and is softer than the recording layer 14. For example, the intermediate layer 15 has a glass transition temperature lower than the glass transition temperature of the recording layer 14. These configurations can be obtained by appropriately selecting a polymer binder (resin) usable as a material for the recording layer 14 and a resin usable as a material for the intermediate layer 15.

This configuration in which an intermediate layer 15 is softer than the recording layer 14 serves to facilitate deformation of the intermediate layer 15 caused by expansion of the recording layer 14 heated by the recording beam, so that deformation can be effected easily at the interface 18 between the intermediate layer 15 and the recording layer 14.

The intermediate layer 15 has a refractive index different from the refractive index of the recording layer 14. This enables reflection of the reading beam by the steep change in refractive index at the interface 18 between the recording layer 14 and the intermediate layer 15. The intermediate layer 15 may preferably be configured to differ moderately from the recording layer 14 in refractive index. To be more specific, it is preferable that the following inequality is satisfied:

$$0.001 < ((n2-n1)/(n2+n1))^2 < 0.04$$

where n1 represents the refractive index of the recording layer 14, and n2 represents the refractive index of the intermediate layer 15.

Since $((n2-n1)/(n2+n1))^2$, i.e., the reflectivity, is greater than 0.001, the quantity of light reflected at the interface 18 is large, so that a high signal-to-noise ratio is achieved in the process of reading information. On the other hand, since the reflectivity is smaller than 0.04, the quantity of light reflected at the interface 18 is restricted to a moderate magnitude, so that the recording/read-back beam can reach deeper recording layers 14 without undergoing considerable attenuation in the recording and reading processes. This makes it possible to increase the storage capacity by providing a large number of recording layers 14.

The refractive index n2 of the intermediate layer 15 may be 1.460 by way of example. When the refractive index n1 of the recording layer 14 is 1.565, $((n2-n1)/(n2+n1))^2$ is 0.001205 which satisfies the above inequality.

In order to adjust the refractive indices of the recording layer 14 and the intermediate layer 15, the composition of the materials for use in the recording layer 14 and for use in the intermediate layer 15 may be adjusted. To be more specific, since the material for the recording layer 14 is prepared by mixing a dye such as a two-photon absorption compound in the polymer binder, the refractive index thereof can be adjusted as desired by appropriately selecting the dye or the polymer binder having an appropriate refractive index and changing their respective composition ratios. The refractive index of the polymer binder varies depending on the degree of polymerization even if they have similar basic constitution. Therefore, the refractive index thereof can also be adjusted by using polymer binders with different degrees of polymerization or by adjusting the degree of polymerization of the polymer binder. Further, adjustment can be made by mixing different kinds of polymer binders. Further, a refractive index matching material (inorganic particulate and the like) may be added to adjust the refractive index.

To adjust the refractive index of the intermediate layer 15, the degree of polymerization of the polymer material such as a resin usable as the material for the intermediate layer 15 may be adjusted. As an alternative, a material usable for the intermediate layer 15 may be optionally added to adjust the refractive index, or the adjustment can also be made by adding a refractive index matching material (inorganic particulate and the like).

The cover layer 16 is a layer provided to protect the recording layers 14 and the intermediate layers 15, and is made of a material which allows the recording/read-back beam to pass through the cover layer 16. The cover layer 16 has an appropriate thickness in the range from several tens micrometers to several millimeters.

A method for recording and reading information in the optical information recording medium 10 as described above will be described hereafter.

Figure 2:
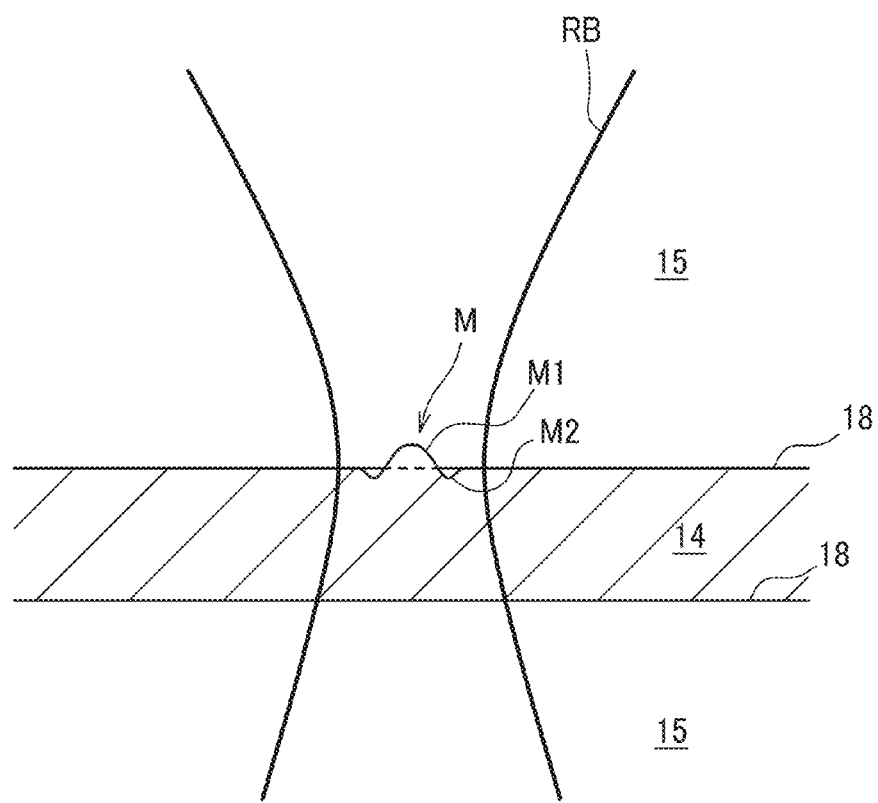
FIG. 2 is a diagram showing a recording spot formed at the time of recording information.

To record information in a desired recording layer 14, as seen in FIG. 2, the recording layer 14 is irradiated with a laser beam (recording beam RB) the output of which is modulated in accordance with the information to be recorded. If the recording layer 14 contains a multiphoton absorption compound as a recording dye, it is preferable that the laser beam used for this recording may be a pulsed laser beam, the peak power of which can be increased. The focal position of the recording beam RB may be set to a position, but not limited thereto, for example, near the interface 18.

When a recording beam RB is applied, as shown in FIG. 2, a center of an area on which the recording beam RB is applied takes a protrusive shape protruding from the recording layer 14 into the intermediate layer 15 and forms a recording spot M (pit). More specifically, the recording spot M includes a center portion which forms a protrusion M1, and an annular recessed portion M2 which surrounds the protrusion M1 and is recessed into the recording layer 14. The distance from the interface 18 (the interface 18 before undergoing a change in shape) to the deepest portion of the recessed portion M2 is smaller than the distance from the interface 18 (the interface 18 before undergoing a change in shape) to the peak of the protrusion M1. In other words, the recording spot M can be considered to assume a generally protrusive shape as a whole. Although the principle of formation of the recording spot M having a protrusively shaped center portion has not been fully elucidated, one assumption as will be described below can be made on the analogy of the principle of formation of a recessed shape in the hitherto known recording scheme by which a center of an area on which the recording beam is applied takes a recessed shape (this principle is also explained based on an assumption).

First, an overview of the conventional recording scheme is summarized with reference to J. Appl. Phys. 62 (3), 1 Aug. 1987 as follows: when a recording beam is applied to a recording material, the temperature of the recording material is caused to increase and the recording material (recording layer 14) expands as shown in FIG. 4(*a*) (the hatched area shows a heated region); then, as shown in FIG. 4(*b*) a portion that has been expanding flows out onto the surrounding area under surface tension; thereafter, as the temperature lowers, the recording material that has expanded contracts and a portion that has flowed out on the surrounding area around the irradiated area is left at a level higher than the reference surface (on the upper surface of the recording layer 14) to form a protrusive shape but a center portion lowers to a level lower than the reference surface as a result of the outflow of the material to form a recessed shape, as shown in FIG. 4(*c*).

In contrast, in the optical information recording medium configured according to this embodiment, when a recording beam RB is applied, the recording layer 14 thermally expands, and the recording layer 14 bulges, like the phenomenon in the conventional recording scheme, as shown in FIG. 4(*a*). However, in this embodiment, the viscosity of a portion of the recording layer 14 near its surface will not lower to such a level as in the conventional scheme because the recording layer 14 is relatively thicker, and thus the outflow as shown in FIG. 4(*b*) will not occur. Therefore, when the portion which has expanded contracts with decreasing temperature, that portion deforms from the shape shown in FIG. 4(*a*) to the shape shown in FIG. 2 such that a protrusion M1 is left at the center and a recessed portion M2 is formed around the protrusion M1.

Figure 3:
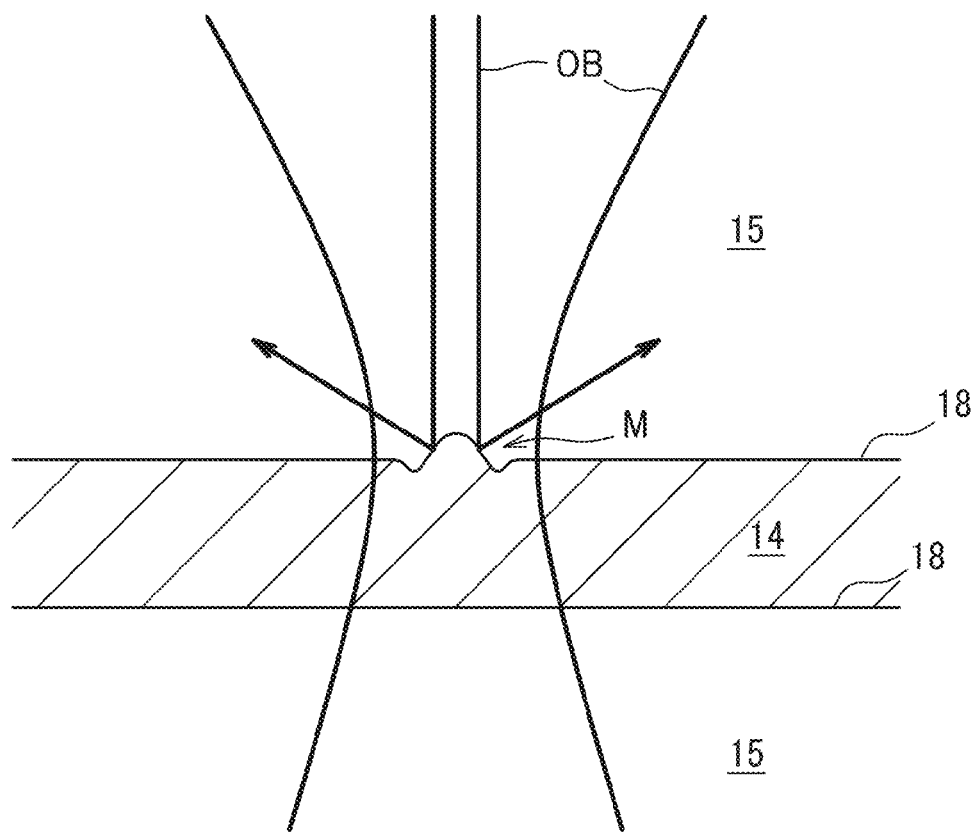
FIG. 3 is a diagram for explaining the state at the time of reading information.

The recording spot M formed as described above can be detected by irradiation with the reading beam OB produced by a continuous-wave laser, as shown in FIG. 3, because a difference in light intensity between the light reflected off the portion surrounding the recording spot M in the front-side interface 18 and the light reflected off the recording spot M, as resulting from a difference between the refractive index of the recording layer 14 and the refractive index of the first intermediate layer 15A, is observed so that the observed modulation of the light intensity makes the recording spot M detectable. To enable such optical detection, it is considered to be preferable that the protrusion M1 protrudes beyond a position of the interface 18 before undergoing a change in shape to such an extent that ranges from 1 to 300 nm or so.

In this embodiment, the recording spot M has a recessed portion M2 formed around the protrusion M1, and thus distribution of the intensity of light reflected off a recording spot M when a reading beam OB for detecting a recording spot M is applied to the recording spot M is expected to change steeply according to the distance from the center of the protrusion M1, more steeply than the configuration in which only the protrusion M1 is present, with the result that a read-back signal with a higher degree of modulation can be obtained.

It is to be understood that the optical information recording medium consistent with the present invention may be such that information is recordable by causing a recording layer 14 to deform into a protrusive shape, and may be such that information is recordable by causing a recording layer to deform into a recessed shape.

To erase the information recorded in the recording layer 14, the recording layer 14 is heated to a temperature around the glass transition temperature of the polymer binder, preferably to a temperature higher than the glass transition temperature, so that the fluidity of the polymer binder is increased and the deformation in the interface 18 disappears due to surface tension to thereby return to its original plane shape; as a result, the information recorded in that information layer 14 can be erased. Because the information is erasable in this way, re-recording (repeated recording) in the recording layer 14 is possible. When the recording layer 14 is heated for that purpose, a method of irradiating the recording layer 14 with a continuous-wave laser beam while focusing the laser beam on the recording layer 14 can be adopted. Through heating by a continuous-wave laser, the information recorded in a continuous region within the recording layer 14 can be erased completely without omission. The continuous-wave laser used may be a laser used for reading back the information, or alternatively, another laser may be used. In either case, it is preferable that a laser configured to emit light having a wavelength at which one-photon absorption can occur is used.

Further, when information is to be erased by heating the recording layer 14, the optical information recording medium 10 may be heated as a whole to a temperature higher than the glass transition temperature of the polymer binder so that the information recorded in all the recording layers 14 can be erased at once. With this method, irrespective of the kind of dyes contained in the recording layer 14, all the information recorded in the optical information recording medium can be erased easily for initialization. Moreover, when the optical information recording medium is to be disposed of, the information can be easily erased.

As described above, in the optical information recording medium 10 according to this embodiment, information can be recorded by forming a recording spot M having a protrusive shape protruding from the recording layer 14 into the intermediate layer 15 at the interface 18. Since high fluidity in the recording layer 14 as would be required in the conventional case where recording is performed by forming a recessed shape is not required in order to form such a recording spot M, high-sensitivity recording can be realized accordingly.

Although the optical information recording medium 10 according to the present embodiment has been described above, the present invention can be implemented in an appropriately modified form without limitation to the above-described embodiment.

In the above-described embodiment, the recording layer 14 is configured to include a polymer binder and a dye dispersed in the polymer binder, but the present invention is not limited to this configuration; the recording layer may be configured to include a polymer to which a dye is bonded.

To be more specific, the recording layer 14 may contain a polymer having a structure represented by the following general formula (2).

[Chem. 3]

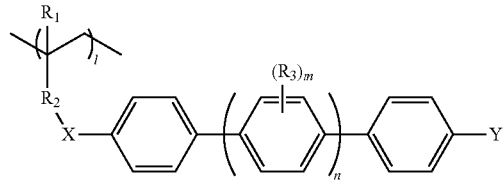

General Formula (2)

In the general formula (2), Y represents a substituent having a Hammett's sigma-para value (σp value) of 0 or more, X also represents the same kind of substituent. X and Y may be the same as or different from each other. n represents an integer of 1 to 4; $R_1$, $R_2$, $R_3$ represent substituents, which may be the same as or different from one another; l represents an integer not less than one; and m represents an integer of 0 to 4.

Figure 5:
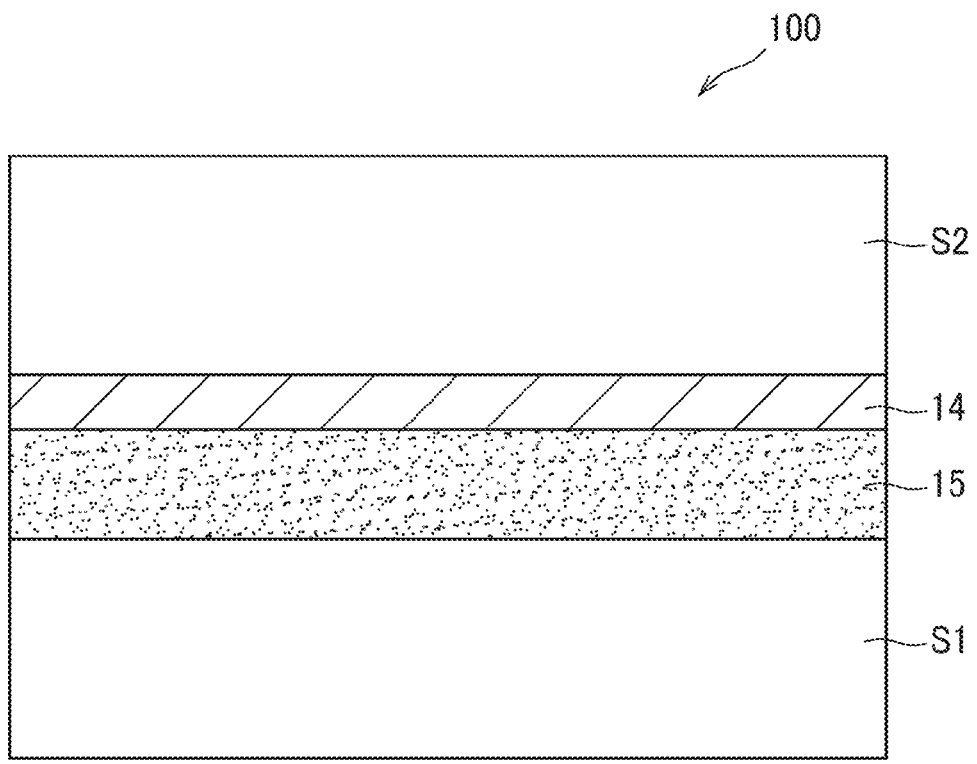
FIG. 5 is a sectional view of a multilayer structure sheet according to the first embodiment.

The optical information recording medium 10 configured as described above may be manufactured by using a multilayer structure sheet 100 as shown in FIG. 5.

The multilayer structure sheet 100 includes a first release sheet S1, an intermediate layer 15, a recording layer 14, and a second release sheet S2. To be more specific, the multilayer structure sheet 100 has a structure in which a two-layer structure of the intermediate layer 15 and the recording layer 14 is sandwiched between the first release sheet S1 and the second release sheet S2. The first release sheet S1 and the second release sheet S2 have surfaces to which a releasing agent is applied, which surfaces face the intermediate layer 15 side and the recording layer 14 side.

The multilayer structure sheet 100 configured as described above may be manufactured by the following method.

Figure 6:
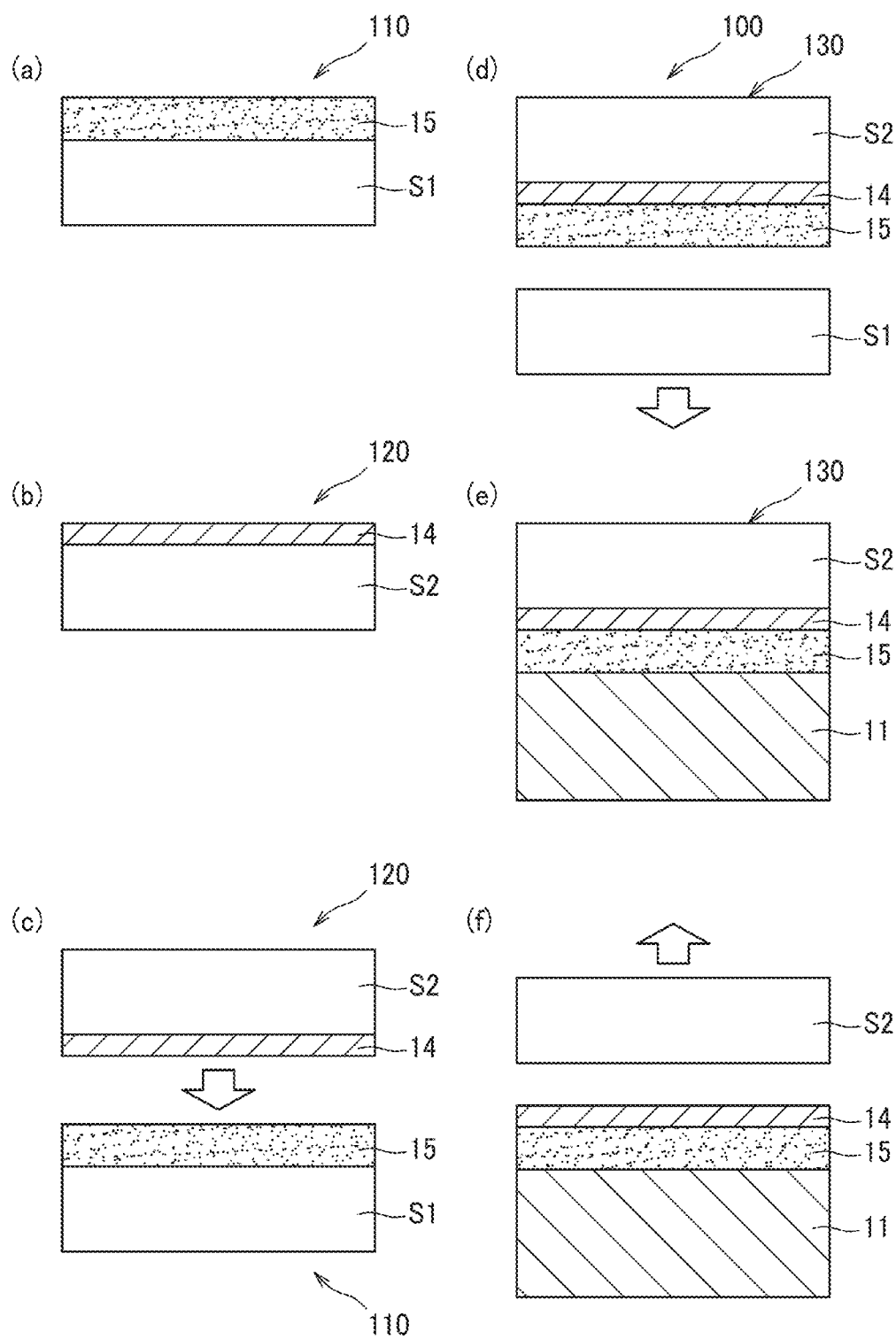
FIG. 6 is a diagram for explaining a method for manufacturing a multilayer structure sheet and an optical information recording medium according to the first embodiment.

First, as shown in FIG. 6(a), an intermediate layer 15 is formed on a surface of a first release sheet S1 on which a releasing agent is applied, to obtain a first sheet 110 (adhesive layer forming step).

On the other hand, as shown in FIG. 6(b), a recording layer 14 is formed on a surface of a second release sheet S2 on which a releasing agent is applied, to obtain a second sheet 120 (recording layer forming step). The releasing agent applied to the first release sheet S1 used herein has a higher-grade releasing property such that a force required for peeling off the first release sheet S1 is weaker than a force required for peeling off the second release sheet S2. It is to be understood that the adhesive layer forming step and the recording layer forming step may be performed in any order.

The method for forming the respective layers may be selected without limitation; for example, knife coating, roll coating, bar coating, blade coating, die coating, gravure coating and any other coating methods may be adopted.

Next, the second sheet 120 is put in an oven or the like and heated (heating step). Heating in this heating step is performed under appropriate conditions (at an appropriate temperature for an appropriate heating time) determined through preliminary experiments. With consideration given to the efficiency of manufacture, the heating time may be the shortest time necessary to yield the benefits of the present invention. The heating method may not be limited to the method using an oven; any method may be feasible as long as the method will not result in consequences adverse to the respective layers and respective release sheets.

Thereafter, the second sheet 120 heated in the heating step is let cool at ambient temperature. Then, as shown in FIG. 6(c), the recording layer 14 of this heated-and-then-cooled second sheet 120 is laminated on the intermediate layer 15 of the first sheet 110, to obtain a multilayer structure sheet (third sheet) 100 as shown in FIG. 5 in which the second sheet is laid on the first sheet 110 (laminating step).

The multilayer structure sheet 100 obtained as described above is rolled up into a roll which is put into a storage, and only a necessary length of which is dispensed therefrom when used.

With the method for manufacturing a multilayer structure sheet 100 according to the present embodiment as described above, the recording layer 14 is heated during the manufacturing process, and thus the risk of cracking occurring in the recording layer 14 when the first release sheet S1 or the second release sheet S2 is removed is reduced. Presumably, this is because the recording layer 14 is softened as a result of heating. Another presumable reason may be that the cooling step performed after the heating and before removal of the first release sheet S1 or the second release sheet S2 causes the once-softened material for the recording layer 14 to contract so that residual stress of compression is produced.

In the above-described embodiment, after the heating step, the second sheet 120 is let cool at ambient temperature; however, the second sheet 120 having been heated may be put into a refrigerator-freezer or the like so that it is cooled in a temperature lower than the ambient temperature (cooling step). By cooling the heated second sheet 120 in a temperature lower than the ambient temperature as described above, the risk of cracking which could occur in the recording layer 14 when the second release sheet S2 is removed from the second sheet 120 can be further reduced.

Next, one example of methods for manufacturing an optical information recording medium 10 using a multilayer structure sheet 100 will be described.

First, the multilayer structure sheet 100 shown in FIG. 5 rolled up in a roll is dispensed, and stamped into the shape of a substrate 11. Then, as shown in FIG. 6(d), a first release sheet S1 is removed from the thus-stamped-out multilayer structure sheet 100 to expose its intermediate layer 15, and a fourth sheet 130 is obtained.

Next, as shown in FIG. 6(e), the exposed intermediate layer 15 of the fourth sheet 130 is stuck to the substrate 11. Then, as shown in FIG. 6(f), the second release sheet S2 is removed. In this way, one intermediate layer 15 and one recording layer 14 are formed on the substrate 11.

Furthermore, a step of stacking an additional fourth sheet 130 on the uppermost recording layer 14 provided on the substrate 11 is repeatedly performed.

Lastly, a cover layer 16 is formed on the uppermost recording layer 14, and an optical information recording medium 10 having a multilayer structure with a plurality of recording layers 14 as shown in FIG. 1 can be manufactured.

According to this manufacturing method, during the manufacturing process, when the first release sheet S1 and the second release sheet S2 are removed from the multilayer structure sheet 100, cracking in the recording layer 14 is unlikely to occur.

Second Embodiment

Next, the second embodiment of the present invention will be described below with reference to the drawings. The second embodiment provides a configuration in which a first intermediate layer 15A and a second intermediate layer 15B are provided as an intermediate layer. In describing the present embodiment, the same elements as in the first embodiment described above will be designated by the same reference numerals and a duplicate description will be omitted.

Figure 7:
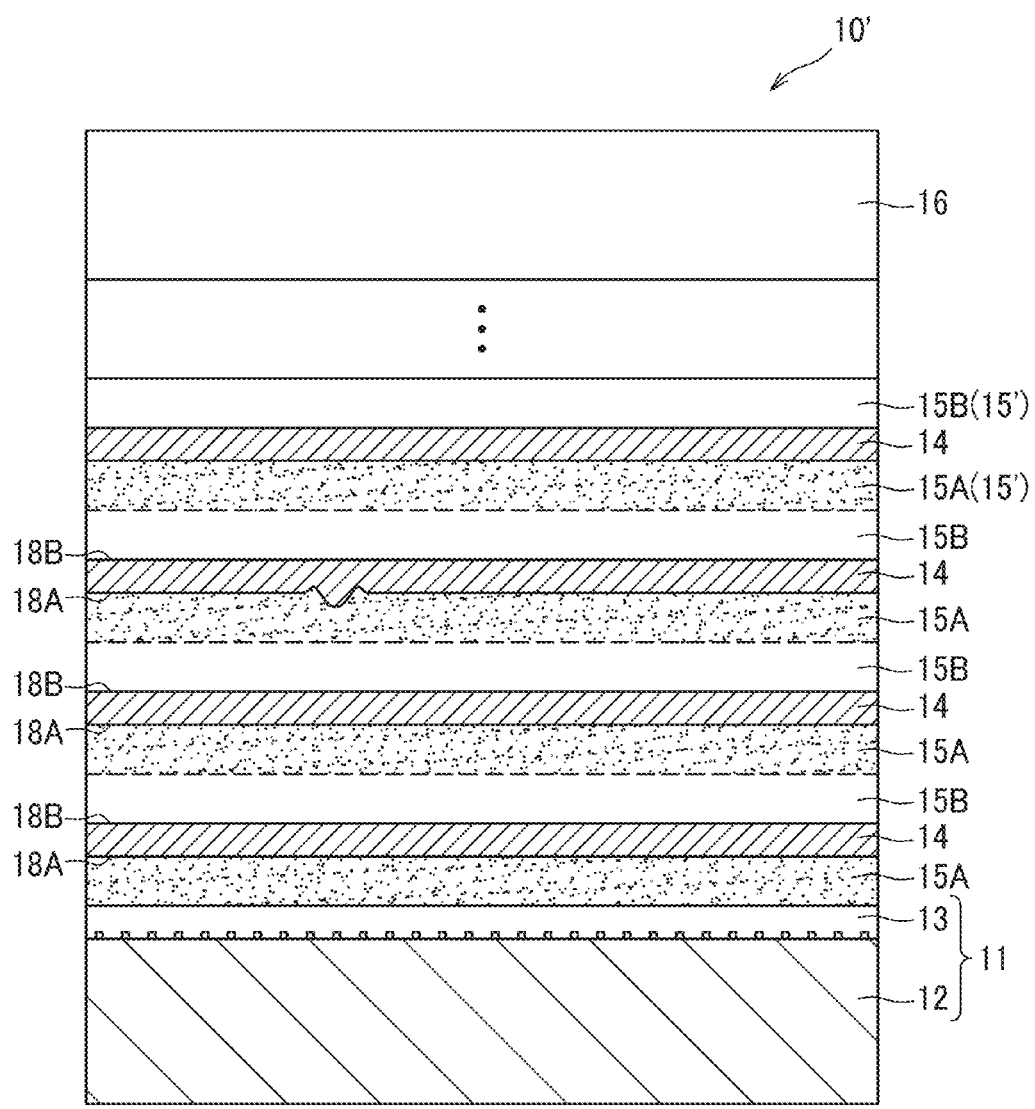
FIG. 7 is a sectional view of an optical information recording medium according to a second embodiment.

As shown in FIG. 7, an optical information recording medium 10' comprises a substrate 11, a plurality of recording layers 14, a plurality of intermediate layers 15' (first intermediate layers 15A and second intermediate layers 15B) and a cover layer 16.

One (one layer) intermediate layer 15' includes a first intermediate layer 15A and a second intermediate layer 15B disposed adjacent to a lower side in FIG. 7 of the first intermediate layer 15A. The first intermediate layer 15A is adjacent to an upstream side of the recording layer 14 and the second intermediate layer 15B is adjacent to a downstream side of the recording layer 14, which upstream and downstream sides are defined with respect to a direction of a recording beam incident on the recording layer 14.

The first intermediate layer 15A is an adhesive layer similar to the intermediate layer 15 of the first embodiment.

The second intermediate layer 15B is a release assisting layer provided to reduce the risk of cracking which would occur in the recording layer 14 when the optical information recording medium 10' is manufactured using a multilayer structure sheet 200 which will be described later (fourth sheet 230).

As a material for the second intermediate layer 15B, a thermoplastic resin or an energy curable resin which is harder than the first intermediate layer 15A, i.e., higher in glass transition temperature, may be preferable. If an energy curable resin is used, the material can easily be applied to an appropriate thickness, and can be caused to cure quickly, so that the manufacture of a multilayer structure sheet 200 (fourth sheet 230) as will be described later can be performed with increased ease. For an energy curable resin to be used, an ultraviolet curable resin may be preferably adopted. Use of the ultraviolet curable resin for forming the second intermediate layer 15B makes it possible to utilize an easy-to-handle ultraviolet ray whose application simply causes the second intermediate layer 15B to cure, and thus is advantageous in manufacturing a large-area multilayer structure sheet.

In the present embodiment, the second intermediate layer 15B may be configured to have a hardness comparable to the recording layer 14 or higher than the recording layer 14. To be more specific, for example, the second intermediate layer 15B may be configured to have a glass transition temperature higher than the glass transition temperature of the recording layer 14. This configuration may be realized by appropriately selecting a resin usable as a material for the recording layer 14 and a resin usable as a material for the intermediate layer 15B.

The second intermediate layer 15B has substantially the same refractive index as the refractive index of the recording layer 14. Herein, it is preferable that the reflectivity of the interface 18B between the recording layer 14 and the second intermediate layer 15B is sufficiently lower than the reflectivity of the interface 18A between the recording layer 14 and the first intermediate layer 15A.

Figure 8:
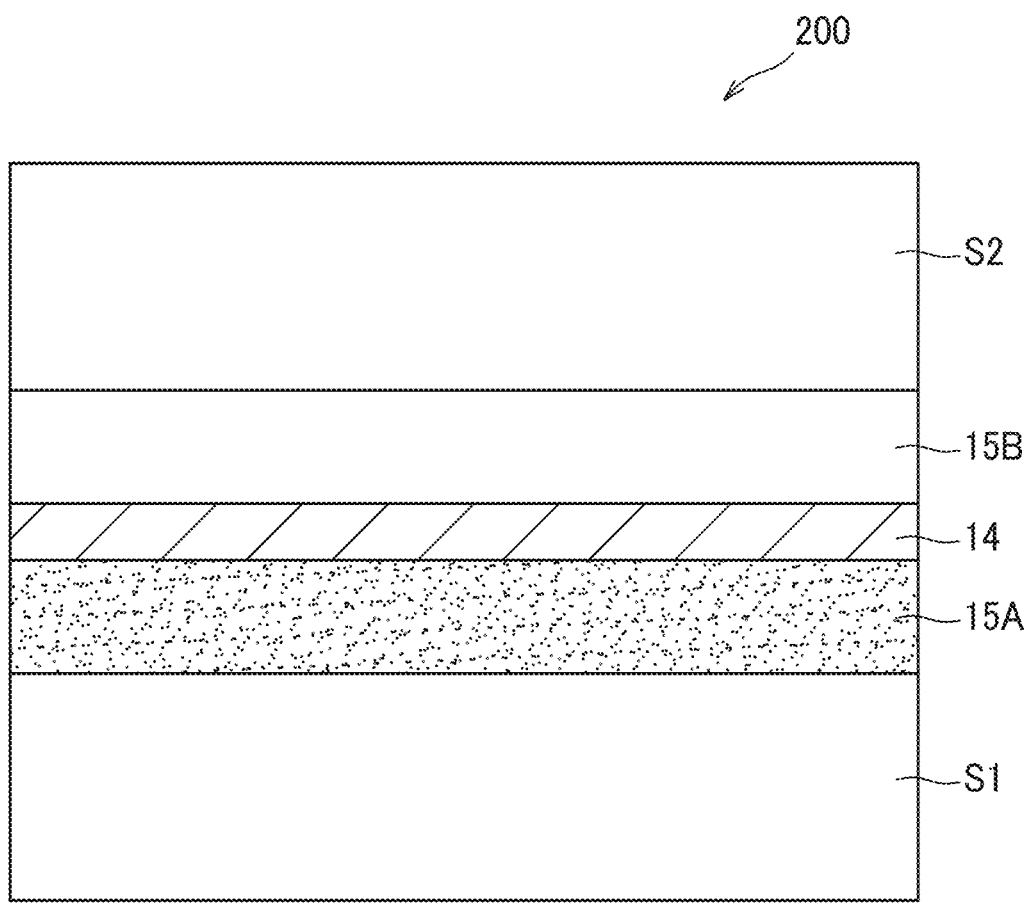
FIG. 8 is a sectional view of a multilayer structure sheet according to the second embodiment.

The optical information recording medium 10' as described above may be manufactured by using a multilayer structure sheet 200 as shown in FIG. 8 (fourth sheet 230 as shown in FIG. 10(a)).

The multilayer structure sheet 200 comprises a first release sheet S1, a second release sheet S2, a recording layer 14, a first intermediate layer 15A and a second intermediate layer 15B. To be more specific, the multilayer structure sheet 200 has such a structure that a three-layer structure in which the recording layer 14 is sandwiched between the first intermediate layer 15A and the second intermediate layer 15B is further sandwiched between the first release sheet S1 and the second release sheet S2. A surface of the first release sheet S1 on which a releasing agent is applied faces the first intermediate layer 15A, while a surface of the second release sheet S2 on which a releasing agent is applied faces the second intermediate layer 15B.

Next, a method for manufacturing a multilayer structure sheet 200 (fourth sheet 230), and a method for manufacturing an optical information recording medium 10' using a multilayer structure sheet 200 (230) will be described.

First, as shown in FIG. 9(a), a first intermediate layer 15A is formed on a surface of a first release sheet S1 on which a releasing agent is applied, to obtain a first sheet 210 (adhesive layer forming step).

On the other hand, as shown in FIG. 9(b), a second intermediate layer 15B is formed on a surface of a second release sheet S2 on which a releasing agent is applied. Further, as shown in FIG. 9(c), a recording layer 14 is formed on the second intermediate layer 15B formed on the second release sheet S2, to obtain a second sheet 220 (recording layer forming step).

Then, the recording layer 14 of the second sheet 220 is laminated on the first intermediate layer 15A of the first sheet 210, to obtain a multilayer structure sheet (third sheet) 200 as shown in FIG. 8 in which the second sheet 220 is laid on the first sheet 210 (laminating step).

Next, the multilayer structure sheet 200 is put in an oven or the like and heated (heating step). During this heating step, as shown in FIG. 10(a), the second release sheet S2 is removed (removing step), to obtain a fourth sheet 230 (multilayer structure sheet) of which the second intermediate layer 15B is exposed.

Then, the fourth sheet 230 is let cool at ambient temperature, and thereafter stamped into the shape of the substrate 11. Then, the stamped-out fourth sheet 230 is, as shown in FIG. 10(b), with its first release sheet S1 side up, put on a first stage T1, and decompressed to thereby get attracted to the first stage T1. In this state, as shown in FIG. 10(c), the first release sheet S1 is removed from the fourth sheet 230.

Then, as shown in FIG. 10(d), the substrate 11 attracted to a second stage T2 by decompressing and the fourth sheet 230 on the first stage T1 are laminated together; thereafter, a roller R provided under the first stage T1 is rolled thereon, so that the first intermediate layer 15A and the substrate 11 are joined by compression.

Thereafter, decompression at the first stage T1 side is released, and the second intermediate layer 15B is separated from the first stage T1. Then, on this second intermediate layer 15B, fourth sheets 230 are laminated on top of another by following the same method as described above. Lastly, a cover layer 16 is formed on the uppermost second intermediate layer 15B, to obtain the optical information recording medium 10'.

According to the method for manufacturing a multilayer structure sheet, as well, as in the first embodiment, the risk of cracking which would occur when the second release sheet S2 is removed from the multilayer structure sheet 200 is reduced. This is, presumably, because the second release sheet S2 is removed under the condition that the recording layer 14 is heated and softened.

Also, when the first release sheet S1 is removed from the multilayer structure sheet 200, as in the first embodiment, the cracking is unlikely to occur.

With this manufacturing method according to the present embodiment, the second intermediate layer 15B is provided between the second release sheet S2 and the recording layer 14, and thus cracking is more unlikely to occur when the second release sheet S2 is removed.

In the present embodiment, the second release sheet S2 is removed from the multilayer structure sheet 200 during the heating step, but the multilayer structure sheet 200 may be cooled at ambient temperature or a temperature lower than ambient temperature after the heating step, before the second release sheet S2 is removed from the multilayer structure sheet 200.

In the present embodiment, an exemplary configuration has been shown in which the manufacture of a multilayer structure sheet and the manufacture of an optical information recording medium using the multilayer structure sheet are performed consecutively, but a multilayer structure sheet (fourth sheet 230) after the steps of removing the second release sheet S2 and cooling may be rolled up and stored in the form of a roll as in the first embodiment, so that it may be used by dispensing only a necessary length thereof and stamping it into the shape of the substrate 11, when the optical information recording medium is manufactured.

EXAMPLES

Next, a description will be given of experiments in which it has been confirmed whether or not cracking occurs in a recording layer for each of different manufacturing methods.

Experiment 1

1. Materials (1) Recording Layer Material
The recording layer material used herein includes a polymer binder and a dye dispersed therein.
Dye Compound A shown below
Polymer binder Polymethylmethacrylate (PMMA) (manufactured by SIGMA-ALDRICH Japan Corporation)

[Chem. 4]

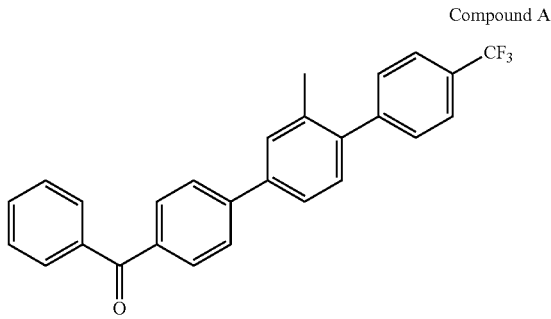

Compound A (2) Adhesive Layer Material
DA-3010 (manufactured by Hitachi Chemical Co., Ltd.) was used as an adhesive layer material.
(3) Release Sheet
Clean Separator HY-US20 (manufactured by Higashi-yama Film Co., Ltd.) was used as a release sheet.

2. Method for Making a Multilayer Structure Sheet

The method for making a multilayer structure sheet for each example was as follows.
(1) Making of a Recording Layer Solution
The recording layer material was mixed with a solvent (2-butanone (manufactured by Wako Pure Chemical Industries, Ltd.)), stirred for 1 hour and dissolved therein, to prepare a recording layer solution.
(2) Making of a Multilayer Structure Sheet
A glass substrate of 1 mm in thickness and 12 cm in diameter was set on a spin coater (manufactured by Mikasa Co., Ltd.), and a release sheet stamped into a piece of 12 cm in diameter was positioned such that a surface thereof on which a releasing agent was applied faced upward, and fixed on the glass substrate. Next, 1 mL of the recording layer solution was applied on the release sheet, and the spin coater was caused to spin at 600 rpm for one minute. Thereafter, the recording layer was dried and finally formed thereon.

Thus-obtained sheet was heated in an oven of which a temperature was kept at a predetermined temperature (see heating temperatures shown in FIG. 11), for thirty minutes, and then taken out from the oven and let cool at the ambient temperature (25° C.) for thirty minutes. In FIG. 11, samples with indication of "not heated" were not subjected to heating, and samples with indication of "not cooled" were not subjected to cooling.

An adhesive layer material was applied to a surface of a newly prepared release sheet on which a releasing agent was applied, and an adhesive layer was formed on the release sheet. Thus-obtained sheet was stamped into a piece of 12 cm in diameter.

The two sheets prepared as described above were laminated together such that the recording layer and the adhesive layer were stacked one on top of the other.

3. Evaluation Method

[Measuring Glass Transition Temperature of Recording Layer Material]
To determine a reference of the heating temperature for the multilayer structure sheet, the glass transition temperature (Tg) of the recording layer material was measured.

The recording layer material was enclosed in a hermetically sealed cell made of SUS using DSC6200R (manufactured by Seiko Instruments Inc.), and the temperature was raised in the range from −100° C. to 100° C. at a rate of 10° C./min. to determine the first glass transition temperature. Further, the temperature was lowered from 100° C. to −100° C. at a rate of 50° C./min. and subsequently raised in the range from −100° C. to 100° C. at a rate of 10° C./min. to determine the second glass transition temperature. The temperature at this point was determined as the glass transition temperature.

[Observing Cracking in Recording Layers]

In ambient temperature, the release sheet attached to each recording layer was removed, and the exposed surface of the recording layer was observed using the Confocal laser microscope OLS-3000 (manufactured by Shimadzu Corporation). The release sheet was removed by folding over an edge thereof separated from the recording layer to an angle of approximately 180 degrees and pulling the edge along the surface of the multilayer structure sheet.

4. Results

[Glass Transition Temperature of Recording Layer Material]

The glass transition temperature of the recording layer material used in Experiment 1 was 62° C.

[Cracking in Recording Layer]

As shown in FIG. 11, the recording layer was heated at various temperatures, and it has been confirmed that if the heating temperature was 50° C. or lower (Comparative Examples 1-1 to 1-3), cracking occurred in the recording layer, while if the heating temperature was 60° C. or higher (Examples 1-1 to 1-4), no cracking occurred in the recording layer. Accordingly, it has been shown that cracking occurring in the recording layer upon removal of the release sheet can be prevented by heating at a temperature not lower than a predetermined temperature.

Experiment 2

In Experiment 2, a recording layer material different from that used in Experiment 1 was used to make a multilayer structure sheet, to investigate whether cracking in the recording layer can be prevented by heating the recording layer even if a polymer to which a dye is bonded is used as a recording layer material.

1. Materials (1) Recording Layer Material

As a recording layer material, Compound B represented below was used.

[Chem. 5]

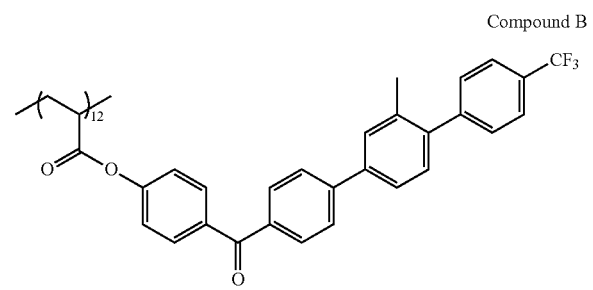

Compound B

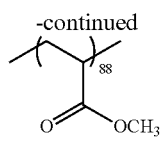

(2) Adhesive Layer Material, Release Sheet

The adhesive layer material and the release sheet used herein were the same as those used in Experiment 1.

2. Method for Making a Multilayer Structure Sheet

The method for making a multilayer structure sheet for each example was as follows.

(1) Making of a Recording Layer Solution

The recording layer material was mixed with a solvent (2-butanone (manufactured by Wako Pure Chemical Industries, Ltd.)), stirred for 1 hour and dissolved therein, to prepare a recording layer solution.

(2) Making of a Multilayer Structure Sheet

The multilayer structure sheet for each Example was made by the same method as the method for making a multilayer structure sheet in Experiment 1.

3. Evaluation Method

[Measuring Glass Transition Temperature of Recording Layer Material]

Measurement of glass transition temperature of the recording layer material was made by the same method as described in the evaluation method of Experiment 1.

[Observing Cracking in Recording Layer]

Observation of cracking in the recording layer for each example and each comparative example was made by the same method as described in the evaluation method of Experiment 1. In Example 2-2, a release sheet was removed from the recording layer which was still in the oven after subjected to heating.

4. Results

[Glass Transition Temperature of Recording Layer Material]

The glass transition temperature of the recording layer material used in Experiment 2 was 42° C.

[Cracking in Recording Layer]

As shown in FIG. 11, the recording layer was heated at various temperatures, and it has been confirmed that if the heating temperature was 60° C. or lower (Comparative examples 2-1 to 2-4), cracking occurred in the recording layer, while if the heating temperature was 70° C. or higher (Examples 2-1 to 2-4), no cracking occurred in the recording layer. Accordingly, it has been shown that cracking occurring in the recording layer upon removal of the release sheet can be prevented by heating at a temperature not lower than a predetermined temperature, even if a polymer to which a dye is bonded is used as a recording layer material.

In Example 2-2, where the recording layer was not cooled after subjected to heating and the release sheet was removed from the recording layer which was still in the oven, however, even in this condition, no cracking occurred in the recording layer. From this, it has been shown that the recording layer is not required to be cooled after subjected to heating but the release sheet may be removed from the recording layer which is in the heated state.

Experiment 3

In Example 3, the heating temperature was kept constant, and experiments were carried out with various cooling temperatures set after heating and with release assisting layer provided in the multilayer structure sheet, whereby the conditions which make cracking in the recording layer more unlikely to occur upon removal of a release sheet were investigated.

(1) Recording Layer Material

As a recording layer material, Compound C represented below was used.

[Chem. 6]

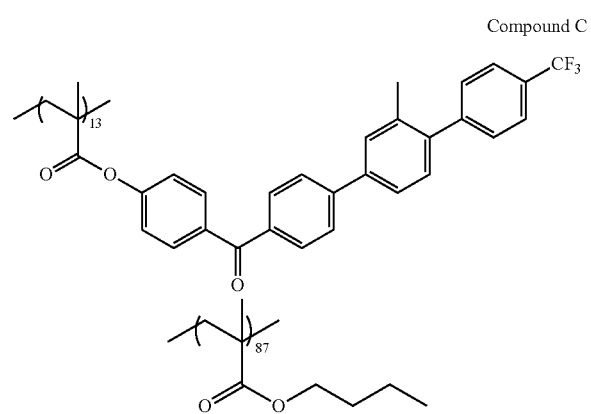

Compound C (2) Adhesive Layer Material, Release Sheet

The adhesive layer material and release sheet used herein were the same as those used in Experiment 1.

(3) Release Assisting Layer Material

As a release assisting layer material, an ultraviolet curable resin SD-640 (manufactured by DIC Corporation) was used.

2. Method for Making a Multilayer Structure Sheet

The method for making a multilayer structure sheet in each Example was as follows.

(1) Making of a Recording Layer Solution

The recording layer material was mixed with a solvent (2-butanone (manufactured by Wako Pure Chemical Industries, Ltd.)), stirred for 1 hour and dissolved therein, to prepare a recording layer solution.

(2) Making of a Multilayer Structure Sheet (2-1) Example 3-1

The multilayer structure sheet used in Example 3-1 was made by the same method as the method for making a multilayer structure sheet in Experiment 1.

(2-2) Example 3-2

A glass substrate of 1 mm in thickness and 12 cm in diameter was set on a spin coater (manufactured by Mikasa Co., Ltd.), and a release sheet stamped into a piece of 12 cm in diameter was positioned such that a surface thereof on which a releasing agent was applied faced upward, and fixed on the glass substrate. Next, 1 mL of the recording layer solution was applied on the release sheet, and the spin coater was caused to spin at 600 rpm for one minute. Thereafter, the recording layer was dried and finally formed thereon.

Thus-obtained sheet was heated in an oven of which the temperature was kept at 100° C., for thirty minutes, and then taken out from the oven, put in a refrigerator-freezer (−20° C., CT-3213 (manufactured by Nihon Freezer Co., Ltd.)), and cooled for thirty minutes.

An adhesive layer material was applied to a surface of a newly prepared release sheet on which a releasing agent was applied, and an adhesive layer was formed on the release sheet. Thus-obtained sheet was stamped into a piece of 12 cm in diameter.

The two sheets prepared as described above were laminated together such that the recording layer and the adhesive layer were stacked one on top of the other.

(2-3) Example 3-3

A glass substrate of 1 mm in thickness and 12 cm in diameter was set on a spin coater (manufactured by Mikasa Co., Ltd.), and a release sheet stamped into a piece of 12 cm in diameter was positioned such that a surface thereof on which a releasing agent was applied faced upward, and fixed on the glass substrate. Next, 3 mL of the release assisting layer material was dropped on the release sheet, and the spin coater was caused to spin at 2000 rpm for 30 seconds. Subsequently, 4.2 inch-SPIRAL LAMP (manufactured by Xenon Corporation) was used for irradiation with ultraviolet rays for a duration of 0.5 second per one round, which irradiation was repeated ten times, so that the release assisting layer was cured. 1 mL of the recording layer solution was applied on the thus-cured release assisting layer, and the spin coater was caused to spin at 600 rpm for one minute. Thereafter, the recording layer was dried and finally formed thereon.

Thus-obtained sheet was put in an oven of which the temperature was kept at 100° C., for thirty minutes, and then taken out from the oven and let cool at the ambient temperature (25° C.) for thirty minutes.

An adhesive layer material was applied to a surface of a newly prepared release sheet on which a releasing agent was applied, and an adhesive layer was formed on the release sheet. Thus-obtained sheet was stamped into a piece of 12 cm in diameter.

The two sheets prepared as described above were laminated together such that the recording layer and the adhesive layer were stacked one on top of the other.

(2-4) Comparative Example 3-1

A glass substrate of 1 mm in thickness and 12 cm in diameter was set on a spin coater (manufactured by Mikasa Co., Ltd.), and a release sheet stamped into a piece of 12 cm in diameter was positioned such that a surface thereof on which a releasing agent was applied faced upward, and fixed on the glass substrate. Next, 3 mL of the release assisting layer material was dropped on the release sheet, and the spin coater was caused to spin at 2000 rpm for 30 seconds. Subsequently, 4.2 inch-SPIRAL LAMP (manufactured by Xenon Corporation) was used for irradiation with ultraviolet rays for a duration of 0.5 second per one round, which irradiation was repeated ten times, so that the release assisting layer was cured. 1 mL of the recording layer solution was applied on the thus-cured release assisting layer, and the spin coater was caused to spin at 600 rpm for one minute. Thereafter, the recording layer was dried and finally formed thereon.

An adhesive layer material was applied to a surface of a newly prepared release sheet on which a releasing agent was applied, and an adhesive layer was formed on the release sheet. Thus-obtained sheet was stamped into a piece of 12 cm in diameter.

The two sheets prepared as described above were laminated together such that the recording layer and the adhesive layer were stacked one on top of the other.

3. Evaluation Method

[Measuring Glass Transition Temperature of Recording Layer Material]

Measurement of glass transition temperature of the recording layer material was made by the same method as described in the evaluation method of Experiment 1.

[Observing Cracking in Recording Layer]

Observation of cracking in the recording layer for each example and each comparative example was made by the same method as described in the evaluation method of Experiment 1. In Example 3-3 and Comparative Example 3-1, a release sheet attached to the release assisting layer was removed before observations were made for cracking of the recording layer.

4. Results

[Glass Transition Temperature of Recording Layer Material]

The glass transition temperature of the recording layer material used in Experiment 3 was 54° C.

[Cracking in Recording Layer]

As shown in FIG. 11, in Example 3-1, after removal of the release sheet attached to the recording layer, cracking was observed slightly in the recording layer, but this cracking was on the order of several micrometers, which should be considered to be approximately within the error-correctable range (not greater than 100 micrometers); therefore, this cracking was negligible in view of its use in an optical information recording medium.

Since some cracking occurred in the recording layer in Example 3-1, the cooling temperature after heating was set at a temperature not higher than an ambient temperature (−20° C.). As a result, in Example 3-2, no cracking occurred in the recording layer even when the release sheet attached to the recording layer was removed.

In Example 3-3, the multilayer structure sheet was configured such that the recording layer was sandwiched between the release assisting layer and the adhesive layer, and subjected to heating and cooling under the same conditions as those adopted in Example 3-1; then, no cracking occurred in the recording layer even when the release sheet attached to the release assisting layer was removed. On the other hand, in Comparative example 3-1, though the multilayer structure sheet having the same configuration as that adopted in Example 3-3 was used, cracking occurred in the recording layer when the release sheet attached to the release assisting layer was removed without preceding heating and cooling steps.

<Test for Recording>

Next, a description will be given of experiments made to check that deformation into a protrusive shape can be effected in the recording layer so that the optical information recording medium is recordable.

1. Recording Material (1) Polymer Binder

As a polymer binder, polymethylmethacrylate 19376 (manufactured by SIGMA-ALDRICH Corporation) was used.

(2) Dye

As a dye, the aforementioned compound A was used.

2. Making of a Recording Medium 2-butanone (manufactured by Wako Pure Chemical Industries, Ltd.) was used as a solvent, into which the aforementioned polymer binder and dye were mixed and stirred for 1 hour and dissolved therein to prepare a recording layer solution.

A release film (Clean Separator HY-US20, manufactured by Higashiyama Film Co., Ltd.) was cut into a piece on the order of 10 cm in width and 20 cm in length, which was placed on a smooth glass plate, and the recording layer solution was applied thereon manually with a blade coater and dried to form a recording layer.

An approximately 2×3 cm-sized adhesive layer (DA-3010, manufactured by Hitachi Chemical Co., Ltd.) was stuck twice on a glass slide (substrate), and a recording layer formed on a release seat was disposed to face to this adhesive layer and stuck thereon. Thereafter, the release seat was removed, and the adhesive layer (DA-3010) was further stuck twice on the recording layer. Lastly, a polycarbonate film (PURE-ACE C110, manufactured by Teijin Chemicals Ltd.) as a cover layer was stuck thereon.

Film thicknesses of the respective layers were measured by MINICOM ELECTRONIC GAGE (TOKYO SEIMITSU) as follows:

| | |
|---|---|
| Glass slide | 1000 micrometers |
| Cover layer | 80 micrometers |
| Adhesive layer (per sheet) | 10 micrometers for each sheet |
| Recording layer | 1 micrometer |

3. Test for Recording, Evaluation Method

A pulsed laser having a 522 nm wavelength was used as a recording laser, and recording was performed with a peak power of 36.8 W and a pulse width of 10 microseconds, on the interface between the recording layer and the adhesive layer.

Next, a cover layer-side adhesive layer was peeled off, and surface profiling was performed using the atomic force microscope (AFM) specified below.

Atomic Force Microscope
 Device:
  Nano Search Microscope OLS-3500 (manufactured by Olympus Corporation)
 Observation Conditions:
  Dynamic mode, Scanning range of 10 micrometers, scanning speed of 1 Hz
  High-aspect-ratio probe AR5-NCHR-20 (manufactured by Nano World AG) was used.

4. Results

Figure 12:
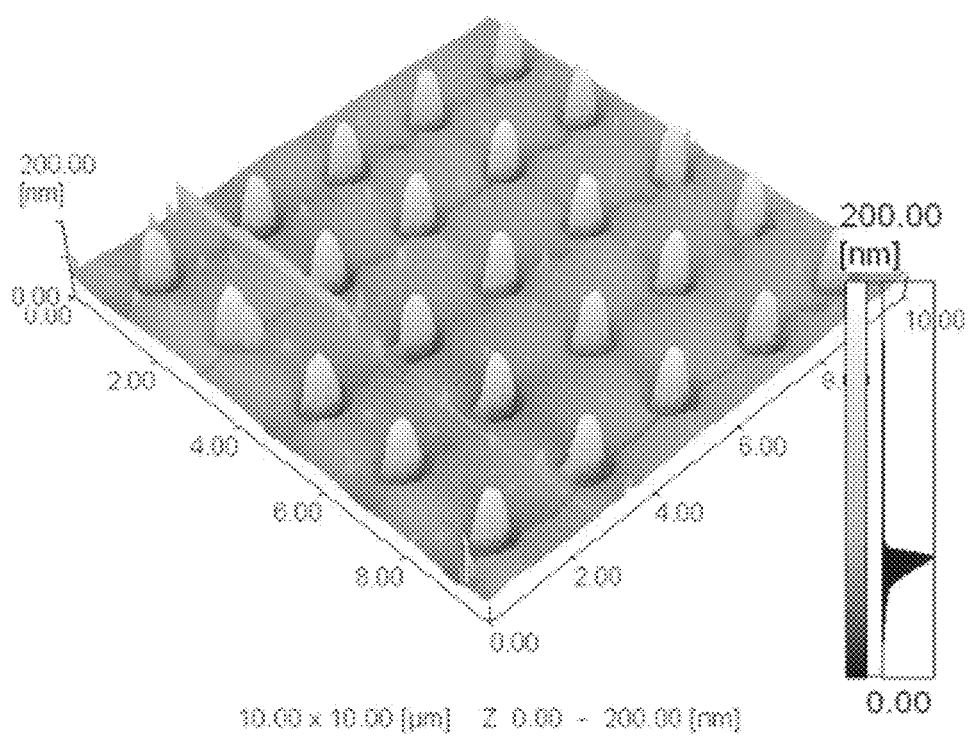
FIG. 12 is an image of the recording spots observed by an atomic force microscope.

The results of surface profiling by the atomic force microscope (AFM) were three-dimensionally represented in FIG. 12. As shown in FIG. 12, projections so formed as to protrude into the adhesive layer at the interface between the recording layer and the adhesive layer were found observable.

Although the recording layer was not heated before the release sheet was peeled off in this experiment, feasibility of recording should not be considered to depend on whether the heating step was performed.

What is claimed is:

1. A method for manufacturing a multilayer structure sheet for manufacturing an optical information recording medium having a multilayer structure with a plurality of recording layers, the method comprising:
 an adhesive layer forming step of forming an adhesive layer on a first release sheet to obtain a first sheet;
 a recording layer forming step of applying a recording layer solution containing a polymer on a second release sheet or a release assisting layer formed on a second release sheet and drying the recording layer solution, thereby forming the recording layer on the second release sheet or the release assisting layer formed on the second release sheet to obtain a second sheet;

a removing step of removing the second release sheet from the second sheet; and a laminating step of laminating the recording layer of the second sheet on the adhesive layer of the first sheet to obtain a third sheet in which the second sheet is adhered to the first sheet;

wherein the method further comprises:

a heating step of heating the second sheet after completion of the recording layer forming step and before the laminating step;

wherein the removing step is performed during the heating step.

2. The method for manufacturing a multilayer structure sheet according to claim 1, further comprising a cooling step, performed after the heating step, of cooling the heated second sheet.

3. The method for manufacturing a multilayer structure sheet according to claim 2, wherein the cooling step comprises placing the second sheet in a temperature lower than ambient temperature.

4. The method according to claim 1, wherein the heating step comprises heating the second sheet at a temperature not lower than 70° C. and not higher than 100° C.

5. The method according to claim 1, wherein the heating step comprises heating the second sheet for 30 minutes or longer.

6. A method for manufacturing a multilayer structure sheet for manufacturing an optical information recording medium having a multilayer structure with a plurality of recording layers, the method comprising:

an adhesive layer forming step of forming an adhesive layer on a first release sheet to obtain a first sheet;

a recording layer forming step of applying a recording layer solution containing a polymer on a second release sheet or a release assisting layer formed on a second release sheet and drying the recording layer solution, thereby forming the recording layer on the second release sheet or the release assisting layer formed on the second release sheet to obtain a second sheet;

a laminating step of laminating the recording layer of the second sheet on the adhesive layer of the first sheet to obtain a third sheet in which the second sheet is adhered to the first sheet; and a removing step of removing the second release sheet from the third sheet;

wherein the method further comprises:

a heating step of heating the third sheet after completion of the laminating step; and wherein the removing step is performed during the heating step.

7. The method according to claim 6, wherein the heating step comprises heating the third sheet at a temperature not lower than 70° C. and not higher than 100° C.

8. The method according to claim 6, wherein the heating step comprises heating the third sheet for 30 minutes or longer.

* * * * *